United States Patent [19]
Gentric

[11] Patent Number: 5,940,533
[45] Date of Patent: *Aug. 17, 1999

[54] METHOD FOR ANALYZING CURSIVE WRITING

[75] Inventor: Philippe Gentric, Issy les Moulineaux, France

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/564,258

[22] PCT Filed: Apr. 20, 1995

[86] PCT No.: PCT/IB95/00280

§ 371 Date: Dec. 19, 1995

§ 102(e) Date: Dec. 19, 1995

[87] PCT Pub. No.: WO95/29458

PCT Pub. Date: Nov. 2, 1995

[30] Foreign Application Priority Data

Apr. 29, 1994 [FR] France .................................. 94 04716

[51] Int. Cl.$^6$ ...................................................... G06K 9/72
[52] U.S. Cl. ......................... 382/186; 382/187; 382/229; 706/13
[58] Field of Search .................................... 382/185, 186, 382/187, 203, 230, 177, 178, 179, 229, 155, 189; 706/13

[56] References Cited

U.S. PATENT DOCUMENTS 4,754,489  6/1988  Bokser ...................................... 382/229
5,029,223  7/1991  Fujisaki .................................... 382/187
5,136,686  8/1992  Koza ........................................... 395/13
5,649,027  7/1997  Mahajan et al. ......................... 382/187

FOREIGN PATENT DOCUMENTS

0564827A2  10/1993  European Pat. Off. ......... G06K 9/72

OTHER PUBLICATIONS

Andre, David, "Learning and Upgrading Rules for an OCR System Using Genetic Programming", Proceedings of the first IEEE Conference on Evolutionary Computation, pp. 462–467, Jun. 27, 1994.

Hsu, L. Soo and Wu, Z. Biao, "Input Pattern Encoding Through Generalized Adaptive Search", International Workshop on Combinations of Genetic Algorithms and Neural Networks, pp. 235–247, Jun. 6, 1992.

*Primary Examiner*—Jon Chang
*Attorney, Agent, or Firm*—Bernard Franzblau

[57] ABSTRACT

Information is extracted from a hand-written text by means of a graphics tablet (1). The curves thus obtained make it possible to recognize primitives, namely basic forms, representing a way of writing a part of a letter. More accomplished forms, called allographs, are constructed from primitives in order to construct a letter or in even a group of two or three letters. When the series of codes corresponds to a known object from a dictionary of allographs (3), each defined by the sequence of codes of its primitives, the corresponding allograph is recognized. The genetic algorithm is used to improve the population of strings. "Descendants", obtained by combining two starting strings (7), are constructed from a limited-quantity selection of strings (9), from among which descendants the most appropriate are in turn chosen, this gradually optimizing the population. Applications: recognition of cursive writing.

15 Claims, 2 Drawing Sheets

METHOD FOR ANALYZING CURSIVE WRITING

BACKGROUND OF THE INVENTION

The present invention relates to a method for analyzing cursive writing, in which elementary forms are recognized in a word written with cursive writing letters or groups of letters are reconstructed from the elementary forms. A dictionary of groups of possible letters is searched for groups identical to resembling the groups constructed from the forms extracted from the writing. A plurality of strings of characters capable of corresponding to the word to be recognized are delivered.

The automatic recognition of manuscript characters allows more natural communication between a user and a computer, without using a keyboard. The function transforms cursive or "script" strokes into a string of characters. In this context, the present invention recognizes writing by recording the motion of the pen and by recognizing words with the aid of a lexicon.

A process for analyzing cursive writing is described in the document EP-A-0 564 827 (International Business Machines). In this process, the written words are compared with those from a dictionary and those which resemble one another sufficiently are regarded as possible, this delivering a list of words. Each word of the list is assigned a score. The word having the best score is chosen.

Current strategies in the field of the recognition of writing focus on the direction of writing (from right to left in western writing). However, the complexity of the problem does not allow the definition of an obvious strategy of analysis. In fact, there is a substantial lack of a priori information.

SUMMARY OF THE INVENTION

The purpose of the invention is to improve the speed of calculation and the recognition performance of such a method.

According to the invention, a reproduction procedure is carried out on the basis of a population of "candidate" strings, that is to say descendants in the genetic sense of the term, are constructed, a descendant string being obtained by crossing, that is to say combining elements picked from two of the said strings of the population, and at least some of the descendant strings are appended to the starting population.

Advantageously, the starting population consists of a selection of only the most appropriate strings, and only the most appropriate are in turn chosen among the descendants to be appended to the starting selection.

The population obtained following a first reproduction procedure may again be subjected to a reproduction procedure.

According to an advantageous embodiment, each of the "parent" strings is picked at random from the starting population, and in each of the "parent" strings, that one of the elements which is picked therefrom in order to construct a descendant is picked therefrom also at random.

With the purpose of enlarging the space of solutions which is explored, mutations are advantageously produced during some of the crossings.

BRIEF DESCRIPTION OF THE DRAWING

These aspects of the invention as well as other more detailed aspects will emerge more clearly by virtue of the following description of a non-limiting embodiment.

DESCRIPTION OF THE PREFERRED EMBODIMENTS

In respect of the recognition of a sequence of written words, it is assumed a priori that a specified language is involved (French, English, etc).

Figure 1:
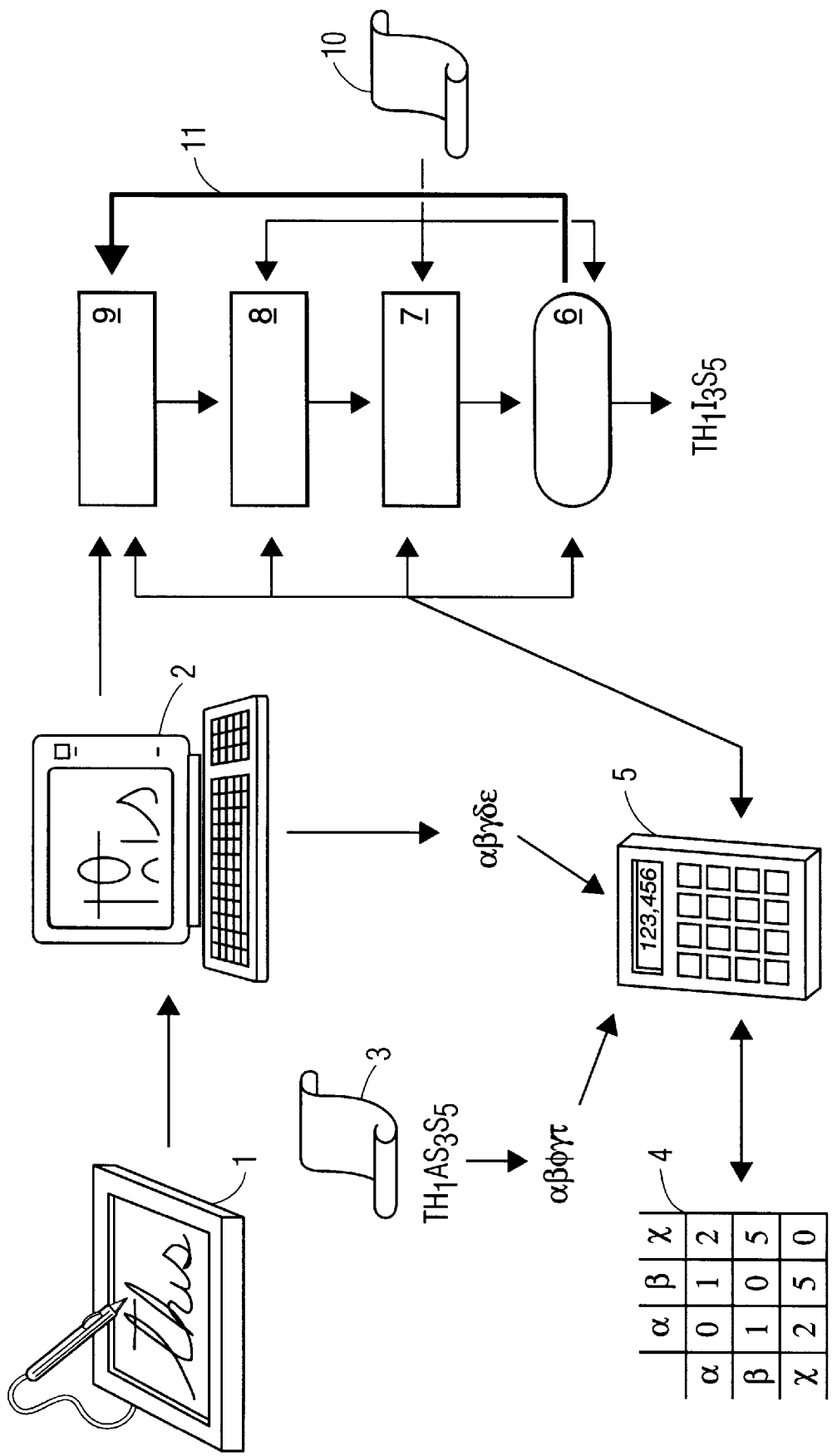
FIG. 1 is a diagrammatic view of the whole of a system for implementing the process according to the invention.

A diagrammatic view of the whole of a system is depicted in FIG. 1. Information is extracted from a handwritten text by means of a graphics tablet 1. Such a tablet records the speed and direction of movement of a pen on a tablet, whilst a person is writing. In order that the characteristics of the writing can be represented by codes, a preprocessing phase is carried out in a processing unit 2. Smoothing of the recorded signals makes it possible to overcome local variations due especially to the acquisition facilities, for example, by using a filter which replaces the components at the instant $T_i$ by the weighted mean of the components at times $T_{i-1}$, $T_i$, $T_{i+1}$. This filter has three components so as to afford filtering of the curves representing the horizontal speed, the vertical speed and the direction angle.

The curves thus obtained make it possible to recognize primitives, namely basic forms, representing a way of writing a part of a letter. Examples of primitives are an upwards spike, a downwards spike, a loop, a dome and a dish. After the preprocessing described above, the processing unit 2 carries out an analysis in order to find primitives. The position of the central zone of the word is estimated by calculating a histogram of the projections of the primitives onto a vertical. Each of the primitives is designated by a code. Twenty-eight different codes (called $\alpha$, $\beta$, $\gamma$, $\delta$, etc) are used, based on four basic primitives (spike, loop, dome or dish, link between two primitives) and by considering their position with respect to the centre of the word. Certain word parts are isolated; for example the bars of the "t"'s and the dots of the "i"'s are extracted.

More accomplished forms, called allographs, are formed from primitives so as to construct a letter or even a group of two or three letters. An allograph is therefore the representation of a way of writing a letter or a group of letters coded on the basis of primitives.

By considering several items of information, such as the parts of the word which are situated below or above the central zone, or the presence of "t" bars or of "i" dots (indicating that the word could contain a "t" or an "i"), and by interpreting the pen movements, a call to a dictionary of allographs makes it possible to find allographs which seem to be present m the writing analyzed and to assemble them in order to make words. The words thus made may very well not exist in the specified language.

The representations of allographs in terms of graphical primitives are built up on the basis of statistical information concerning the way in which the subject writes the 26 letters as well as the most often used digraphs or trigraphs (allographs with respectively two or three characters are called digraphs or trigraphs). When the series of codes corresponds to a known object from a dictionary of allographs, which is defined by the sequence of codes of its primitives, the corresponding allograph is recognized. Often only some of the codes of an allograph to be recognized correspond to a sequence of codes from the dictionary, and the allograph is not recognized with certainty. Several among the most probable solutions are then retained and in this way a population of possible solutions is processed next.

The individuals of the population of possible solutions are called "strings". The representation of a string by the list of primitives describing how the word is written in cursive writing is called the "graphical image". A string can also be represented by the ASCII codes which define the letters thereof, and this representation is called the "lexical image".

Figure 2:
FIG. 2 represents pieces of letters used in determining the elements of words.
Figure 3:
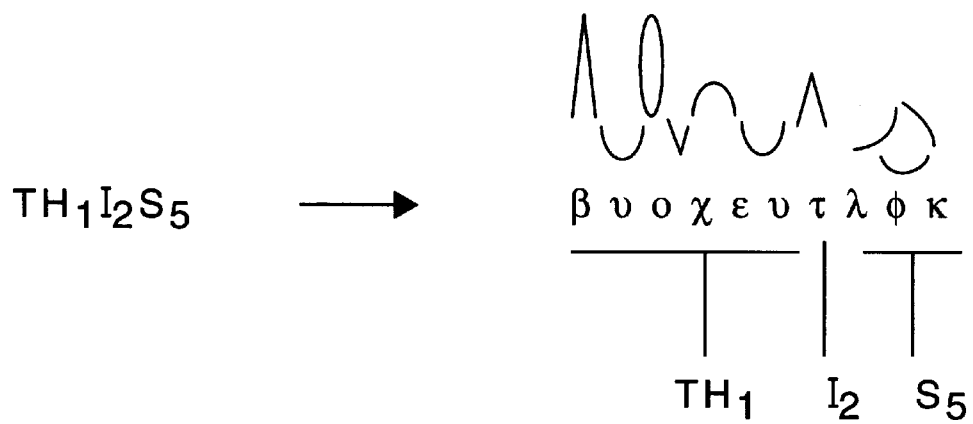
FIG. 3 illustrates the coding of the basic graphical elements of the word "this".

FIG. 2 represents the primitives, slightly separated from one another relative to their position in a cursive script in which they would be joined up, of the allograph "$TH_n$", the $n$ indicating that this is an $n^{th}$ way of writing the group of letters t, h. It consists of a tall upwards spike (code $\beta$), followed by a dish (code $v$), a loop (code o), a short downwards spike (code $\chi$), followed by a dome (code $\epsilon$), and by a dish (code $v$). Another illustration is the string $TH_1I_2S_5$ (FIG. 3), which is composed of three allographs and whose lexical image is the word "this". Its graphical image is the list: $\beta$, $v$, o, $\chi$, $\epsilon$, $v$, $\tau$, $\lambda$, $\phi$, $\kappa$.

The similarity between the graphical image of the string proposed as solution and the coding of the primitives of the word recorded by the graphics tablet 1 (FIG. 1) and delivered in the form of codes of primitives by the processing unit 2 is called the "fitness". For example if the word to be recognized is that the string "$TH_1I_2S_5$" has a higher fitness than "$B_2L_1UE_1$", because it corresponds better, although the correspondence is not complete.

The fitness is evaluated by a fitness evaluation module 5 using a classical method of evaluating the correspondence between strings, for example, the so-called "modified Levenshtein distance" method (4).

A genetic algorithm is used to improve the population of strings. This is a procedure in which descendants, in the genetic sense of the term, namely strings obtained by combining starting strings, are constructed from a limited-quantity selection of strings, from among which descendants the most appropriate are in turn chosen, this gradually optimizing the population. Thus the word retained at the very end is the one which corresponds to the string having the best fitness.

Preanalysis of the word to be recognized has delivered several strings of primitives, constituting the initial population which it will be sought to improve. A lexical analyzer generates, on the basis of a string of primitives, (for example $\alpha\beta\gamma\delta\epsilon$), a list of possible words (for example TH AS S) from words contained in a dictionary of allographs 3. One way of representing each letter or group of letters is chosen at random from various ways of representing each letter or group of letters (for example $TH_1$=first way of writing TH, $AS_3$=third way of writing AS, $S_5$=fifth way of writing S), and is used to transform these words from the lexicon into graphical images (here $\alpha\beta\phi\gamma\tau$). The initial population is thus constructed with codings of allographs based on the words from a dictionary of allographs.

Ordinarily in genetic methods the individuals constituting a population have a fixed size. Here on the contrary the length of a string is not fixed. The genetic algorithm is implemented by virtue of operators 6 to 9. Each of the operators calls upon the fitness evaluation module 5, specifically to decide whether an individual from the population should be eliminated or preserved. The selection operator 9 makes it possible to contrive that, on average, the best strings are not lost and the worst disappear. For each string it determines whether it should be preserved or destroyed, according to a probability connected with the fitness, which is evaluated by the fitness evaluation module 5. The processing unit 2 delivers the staring population to the module 9.

Two other operators are used: a crossing operator 7 and a mutation operator 8.

Figure 4:
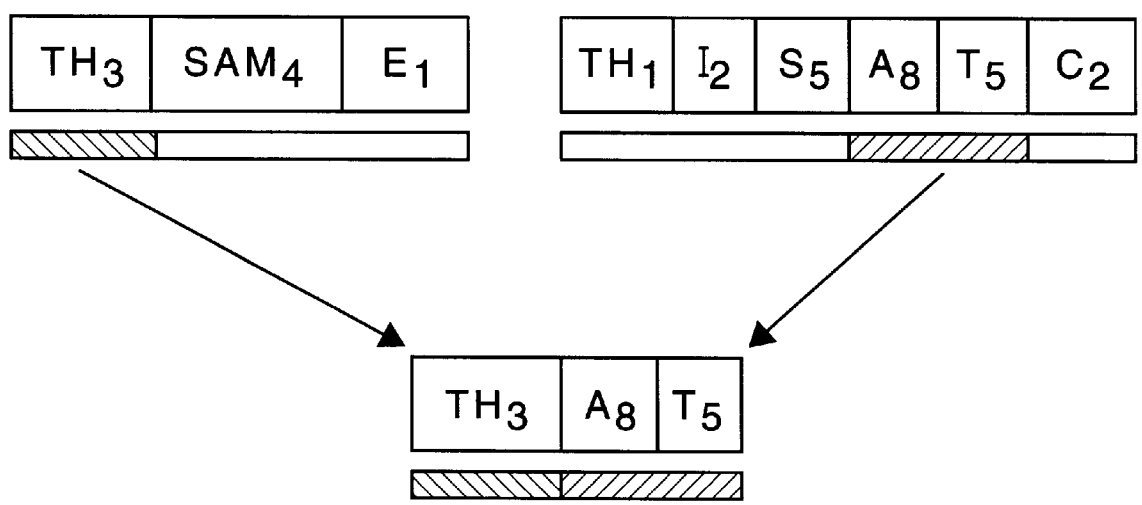
FIG. 4 represents diagrammatically the way to generate a descendant from two individuals.

Each string contains a share of significant information which forms its fitness. Unfortunately, it is awkward to locate this information in the string since the fitness is a global value relating to the whole of the string. A statistical method is used in the crossing operator 7 to solve this problem: firstly, strings from the population which are chosen at random are associated pairwise, the randomness being weighted to give the strings having a higher fitness a higher probability of being chosen. Next, each pair of strings undergoes a crossing as represented in FIG. 4. The new string does not necessarily have a better fitness than its "parents", and a call to the fitness evaluation module makes it possible to choose the "offspring" to be preserved. As the starting population contains a limited number of allographs, the number of solutions which will be reviewed is limited. For the purpose of enlarging the space of solutions which is explored, the mutation operator 8 introduces noise into the crossing procedure: an allograph may be altered during the crossing, with a probability fixed at the start. Three types of mutation may be introduced, with various proportions of changed allographs relative to the total allographs of a string:

an alteration, that is to say an allograph changes: for example $TH_3SAM_4E_1 \rightarrow TH_3AT_2E_1$ an insertion, that is to say a new allograph is introduced: for example $TH_3SAM_4E_1 \rightarrow TH_3SAM_4AT_2E_1$ a deletion, that is to say an allograph disappears: for example $TH_3SAM_4E_1 \rightarrow TH_3E_1$ The value of a population depends on the way in which the new strings are chosen or generated, and how their mutations are operated. To improve the procedure, genetic operators are defined with a view to avoiding, as far as possible, the loss or degradation of significant word elements. A significant word element is a sub-string which possesses characteristics possessed by the best strings.

When the lexical image has a poor fitness, the string should at least contain as many valid digraphs or trigraphs as possible (a digraph or a trigraph is valid if it is present in the dictionary of allographs: this presence depends especially on the language, for example the digraph "KN" is very rare in French whilst it is frequent in English). In an attempt to preserve these significant elements, the mutation or crossing operators 7 and 8 act in the following non-deterministic manner: considering the lexical image of a string, a transformation of a digraph or of a trigraph is accepted (probabilistically) if it creates a valid digraph or trigraph, or if it avoids the destruction thereof.

So long as it has not been decided to stop the procedure, each string output by one of the operators 7 or 8 ascends to the selection operator 9 so as to be appended to the population (arrow 11).

The module 6 determines whether the procedure should continue or be stopped. The effect of the action of the mutation operator is that the population is never entirely stable, which implies that the procedure could be continued indefinitely. Several criteria are used in the stop decision module 6 to determine whether or not a solution is valid and to decide to stop:

the best string has a lexical image which is in the dictionary of possible words 10, the number of iterations reaches a set limit, the fitness of the best strings is higher than a given value (for example, the graphical image of a string matches perfectly with the list of primitives of the word to be analyzed), all the trigraphs of the lexical image of the best string are valid. A rapid analysis is carried out to decide whether, even though the lexical image does not belong to the dictionary of possible words, there are enough reasons for it to be valid: for example, if all the quadrigraphs of the form "X*ZT" or "XY*T" are valid, the lexical image XYZT is capable of being a proper solution, even though XYZT does not belong to the dictionary, the number of the best representatives of strings exceeds a fixed proportion of the total population.

It should be noted that the last four conditions accord the algorithm the possibility of delivering a result which is not in the dictionary of possible words.

If several different strings exist which are "first among equals", it is not possible to decide among them. In general each of these different strings itself exists as several specimens, thus being populations of several identical strings. They are then sorted, searching for the most numerous of these populations: this is in general the best one.

I claim:

1. A method for analyzing cursive writing, said method comprising the steps of recognizing elementary forms in a word to be recognized that is written with cursive writing;

reconstructing target allographs from the elementary forms;

searching a dictionary of a plurality of defined allographs for a set of defined allographs identical to or resembling the target allographs;

delivering a plurality of strings of characters based on the set of defined allographs capable of corresponding to the word to be recognized;

performing a reproduction procedure on the plurality of strings based on a starting population of parent strings, by constructing descendant strings, each descendant string being obtained by crossing, at least some of the descendant strings being appended to the starting population.

2. A method according to claim 1, wherein the starting population includes a selection of only the most appropriate parent strings, additionally the most appropriate parent strings being chosen from among the descendant strings for addition to the starting population of parent strings.

3. A method according to claim 2, wherein:

a refined population is obtained following the reproduction procedure; and the reproduction procedure is performed again on the obtained refined population.

4. A method according to claim 2, wherein each of the parent strings is picked at random from the starting population.

5. A method according to claim 2, wherein mutations are introduced during some of the crossings.

6. A method according to claim 1, wherein each of the parent strings is picked at random from the starting population.

7. A method according to claim 1, wherein crossing combines elements picked from two parent strings of the starting population.

8. A method according to claim 7, wherein for each of the parent strings, at least one of the elements which is picked therefrom to construct a descendant string is picked therefrom at random.

9. A method according to claim 8, wherein mutations are introduced during some of the crossings.

10. A method according to claim 7, wherein mutations are introduced during some of the crossings.

11. A method according to claim 1, wherein mutations are introduced during some of the crossings.

12. A method according to claim 1, wherein:

a refined population is obtained following the reproduction procedure; and the reproduction procedure is performed again on the obtained refined population.

13. A method according to claim 12, wherein each of the parent strings is picked at random from the starting population.

14. A method according to claim 12, wherein mutations are introduced during some of the crossings.

15. A method according to claim 6, wherein mutations are introduced during some of the crossings.

* * * * *